(12) United States Patent
Ecton

(10) Patent No.: US 12,429,072 B2
(45) Date of Patent: Sep. 30, 2025

(54) CYLINDER LEAK CONTROL DEVICE

(71) Applicant: Zackery Ecton, Falls River, KS (US)

(72) Inventor: Zackery Ecton, Falls River, KS (US)

( * ) Notice: Subject to any disclaimer, the term of this patent is extended or adjusted under 35 U.S.C. 154(b) by 0 days.

(21) Appl. No.: 18/587,038

(22) Filed: Feb. 26, 2024

(65) Prior Publication Data

US 2024/0376914 A1 Nov. 14, 2024

Related U.S. Application Data

(60) Provisional application No. 63/500,735, filed on May 8, 2023.

(51) Int. Cl.
*F15B 15/14* (2006.01)

(52) U.S. Cl.
CPC ...... *F15B 15/1428* (2013.01); *F15B 15/1452* (2013.01); *F15B 15/1461* (2013.01)

(58) Field of Classification Search
CPC .............. F15B 15/1433; F15B 15/1452; F15B 15/1461; F15B 20/005; F16J 15/16
See application file for complete search history.

(56) References Cited

U.S. PATENT DOCUMENTS

| | | | | |
|---|---|---|---|---|
| 3,943,717 A * | 3/1976 | Schexnayder | ......... | F16J 15/004 277/513 |
| 4,889,167 A * | 12/1989 | Morris | ................. | F16L 55/172 138/110 |
| 5,247,967 A * | 9/1993 | Bourque | ................. | F16L 55/16 138/97 |
| 5,497,808 A * | 3/1996 | Schlund | ............. | F16L 55/1683 138/97 |
| 5,706,862 A * | 1/1998 | Meinerding, Sr. | ...... | F16L 55/17 138/98 |
| 6,780,489 B2 | 8/2004 | Kingery | | |
| 6,974,617 B2 | 12/2005 | Kingery | | |
| 8,512,552 B1 | 8/2013 | Rossi | | |
| 2004/0142146 A1 | 7/2004 | Kingery | | |
| 2005/0003137 A1 | 1/2005 | Kingery | | |
| 2014/0333033 A1* | 11/2014 | Kiecksee | ................. | F16F 9/36 277/550 |
| 2023/0358256 A1* | 11/2023 | Myles | ................. | F15B 15/1452 |

FOREIGN PATENT DOCUMENTS

WO WO-2013140878 A1 * 9/2013 .......... F15B 15/1423
WO WO-2017160163 A1 * 9/2017 .............. F15B 15/14

* cited by examiner

*Primary Examiner* — Thomas E Lazo
(74) *Attorney, Agent, or Firm* — Brennan, Manna & Diamond, LLC

(57) ABSTRACT

The hydraulic cylinder leak control device is a variable leak containment device for hydraulic cylinders. The hydraulic cylinder leak control device comprises a body component that is configured in a rectangular shape that is long enough to encircle the largest outside surface of various hydraulic cylinders and held in place by a hose clamp. The body component would be rigid enough to contain leaking hydraulic fluid within an absorbent wrap or towel around the outer surface of the hydraulic cylinder. The body component also comprises fingers to close around the piston end of a hydraulic cylinder to contain any possible leak points of the hydraulic cylinder. Thus, each leak control device functions as a suitable way of containing hydraulic fluid from escaping and causing the equipment to be removed from service.

15 Claims, 3 Drawing Sheets

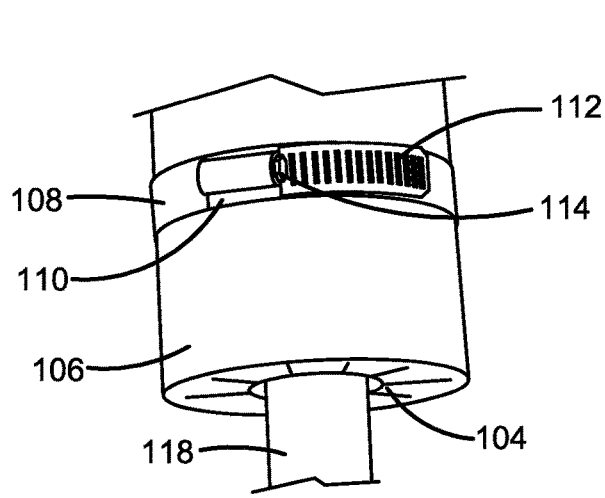

FIG. 5A

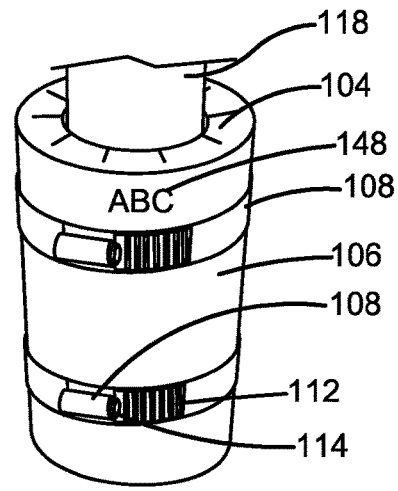

FIG. 5B

```
┌─────────────────────────────────────────────┐
│ Providing a hydraulic cylinder leak control │
│ component comprising a body component,      │──600
│ finger components, a hose clamp component,  │
│ and a fluid absorbent mat or cloth          │
└─────────────────────────────────────────────┘
                      │
                      ▼
┌─────────────────────────────────────────────┐
│ Wrapping a leaking hydraulic cylinder with  │──602
│ the fluid absorbent mat or cloth            │
└─────────────────────────────────────────────┘
                      │
                      ▼
┌─────────────────────────────────────────────┐
│ Cutting to length the body component        │──604
│ according to the circumference of the       │
│ leaking hydraulic cylinder                  │
└─────────────────────────────────────────────┘
                      │
                      ▼
┌─────────────────────────────────────────────┐
│ Securing the body component around the mat, │
│ such that the finger components cover the   │──606
│ piston port of the hydraulic cylinder       │
└─────────────────────────────────────────────┘
                      │
                      ▼
┌─────────────────────────────────────────────┐
│ Securing a hose clamp component to the body │
│ component, which secures the body component │──608
│ in place to allow the equipment to continue │
│ in service                                  │
└─────────────────────────────────────────────┘
```

FIG. 6

CYLINDER LEAK CONTROL DEVICE

CROSS-REFERENCE TO RELATED APPLICATION

The present application claims priority to, and the benefit of, U.S. Provisional Application No. 63/500,735, which was filed on May 8, 2023, and is incorporated herein by reference in its entirety.

FIELD OF THE INVENTION

The present invention relates generally to the field of hydraulic cylinder leak control devices. More specifically, the present invention relates to a device that will easily conform to a hydraulic cylinder to control leaks until a repair can be made. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in hydraulic cylinder leak control devices. Generally, when a seal deteriorates on a hydraulic cylinder, the fluid will leak, causing a mess. It also causes environmental hazards, which can hold up work on a job site. These leaks often start as a seep, which if easily managed, can reduce downtime.

Accordingly, there is a demand for an improved hydraulic cylinder leak control device that can control leaks that happen when using hydraulic cylinders. More particularly, there is a demand for an easily applied way to control leaking hydraulic fluid from a failing hydraulic cylinder that can be cut to length to account for different sized cylinders.

Therefore, there exists a long-felt need in the art for a hydraulic cylinder leak control device that provides users with a means for controlling leaking hydraulic fluid from a hydraulic cylinder. There is also a long-felt need in the art for a hydraulic cylinder leak control device that features a flat body component with finger components to hold fluid absorbing mats or cloths in place around the hydraulic cylinder. Further, there is a long-felt need in the art for a hydraulic cylinder leak control device that enables users to have a temporary solution to control hydraulic fluid and allow the equipment to continue operation until a technician is available for a permanent repair. Finally, there is a long-felt need in the art for a hydraulic cylinder leak control device that can be used for all types of hydraulic cylinders of various sizes and locations around various equipment.

The subject matter disclosed and claimed herein, in one embodiment thereof, comprises a hydraulic cylinder leak control device. The device is a variable leak containment device for hydraulic cylinders. The hydraulic cylinder leak control device comprises a flat body component that is configured in a rectangular shape that is long enough to encircle the largest outside surface of various hydraulic cylinders. The flat body component would be rigid enough to contain leaking hydraulic fluid within an absorbent wrap or cloth around the outer surface of the hydraulic cylinder. The flat body component also comprises finger components to close around the piston component end of a hydraulic cylinder to contain any possible leak points of the hydraulic cylinder. Once in place, the body component is secured against the outside surface of the cylinder via a hose clamp. Thus, each leak control device functions as a suitable way of containing hydraulic fluid from escaping and causing the equipment to be removed from service. The device can also be used for any size and shape of hydraulic cylinders for a temporary solution to leaking hydraulic fluid.

In this manner, the hydraulic cylinder leak control device of the present invention accomplishes all the foregoing objectives and provides users with a device that provides a temporary solution to leaking hydraulic fluid from deteriorating hydraulic cylinders. The device is a flexible but rigid band with fingers that can be wrapped around a leaking hydraulic cylinder and held in place with a hose clamp.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a hydraulic cylinder leak control device. The device is a variable leak containment device for hydraulic cylinders. The hydraulic cylinder leak control device comprises a flat body component that is configured in a generally rectangular shape. The flat body component would be manufactured to be flexible enough to wrap around the outer casing of a hydraulic cylinder and rigid enough to hold a fluid absorbing mat or cloth. Thus, each hydraulic cylinder leak control device functions as a suitable way of containing hydraulic fluid leaks and allowing for continued function until maintenance personnel can repair the hydraulic cylinder.

In one embodiment, hydraulic cylinders tend to leak or seep, which can cause environmental hazards. A typical hydraulic cylinder comprises an outer casing or exterior surface, a bottom, and a piston. The outer casing is generally cylindrical in shape with the top surface closed off and a bottom surface open to accept the piston. Hydraulic fluid is generally placed into the inside space of the hydraulic cylinder. The piston is placed through an opening in the bottom to allow for the piston to move axially to the hydraulic cylinder. The bottom seals around the piston, but this is also where leaks can form after repeated use. The hydraulic cylinder leak control device of the present invention is then applied to the exterior surface of the hydraulic cylinder to control the leak until it can be repaired.

In one embodiment, the hydraulic cylinder leak control device comprises a flat body component. The flat body component is generally rectangular in shape and is manufactured of a material that is flexible enough to be wrapped around the outer casing of the hydraulic cylinder. The flat body component can be any suitable shape as is known in the art, as long as the body component is sized and shaped to wrap around the circumference of a hydraulic cylinder and manage a leak. Further, the body component comprises a front surface, a back surface, opposing right and left sides, and opposing top and bottom sides. The body component would be available in various lengths and would typically be provided in a length long enough that a user would cut the body component to fit the circumference of the hydraulic cylinder. Thus, a user would measure the circumference of the hydraulic cylinder and then cut the body component to the determined length to wrap around the circumference of the hydraulic cylinder for use.

In another embodiment, the flat body component comprises a plurality of finger components or pointed projections positioned to be extending from the top side or the bottom side, or both of the opposing top and bottom sides of the flat body component. The flat body component and the plurality of finger components would be manufactured to be rigid enough to hold a fluid absorbing mat or cloth against the hydraulic cylinder in the area of the leak. The plurality of finger components are generally triangular shaped with the point of the triangle pointing away from the body component. The triangles are of a size and shape that when the body component is wrapped around the outer casing of the hydraulic cylinder, the plurality of fingers close together around the piston of the hydraulic cylinder, creating a seal.

In one embodiment, the body component can be configured in a round, donut-shape that will encircle the outer casing of the hydraulic cylinder. Thus, the body component is a round body component, that would be circular in shape to match the circumference of the hydraulic cylinder. The round body component would be pre-formed to a specific circumference or could have a split running from top to bottom, to allow a user to spread apart the body component and position it on the hydraulic cylinder. Further, the round body component would have a circular body with a front surface, a back surface, and an opposing top and bottom sides. In this embodiment, the round body component would also comprise a plurality of finger components or pointed projections positioned to be extending from the top side or the bottom side, or both of the opposing top and bottom sides of the round body component. The round body component and the plurality of finger components would be manufactured to be rigid enough to hold a fluid absorbing mat or cloth against the hydraulic cylinder in the area of the leak. The plurality of finger components are generally triangular shaped with the point of the triangle pointing toward the center of the round body component. The triangles are of a size and shape that when the body component is positioned around the outer casing of the hydraulic cylinder, the plurality of fingers close together around the piston of the hydraulic cylinder, creating a seal.

In one embodiment, the hydraulic cylinder leak control device comprises a fluid absorbing mat or cloth. The fluid absorbing mat or cloth can be any suitable shape and size as is known in the art, as long as the fluid absorbing mat or cloth is sized and shaped to fit underneath the flat or round body component. Generally, the mat or cloth is configured in a rectangular shape to mimic the shape of the body component. Further, the mat or cloth is manufactured of any suitable fluid absorbing material as is known in the art, such as cotton, terrycloth, hemp, bamboo, nylon, etc. In use, the mat or cloth is positioned over the outer casing of the leaking hydraulic cylinder and covered with the flat or round body component, and secured.

In another embodiment, the flat or round body component is manufactured with the fluid absorbent material as an integral part of the back surface of the flat or round body component. The fluid absorbent material can be secured to the back surface of the flat or round body component by use of adhesive, screws, snap features, or any other securing means known in the art. Further, the fluid absorbing mat or cloth is manufactured from cotton, hemp, bamboo, or any other suitable absorbent material known in the art.

In one embodiment, the flat or round body component is secured to the outer casing of the hydraulic cylinder via a hose clamp component. The hose clamp component is a typical hose clamp component as is known in the art and comprises a bracket component, a band component, and a screw component. The bracket component allows the band component to circle around the outer surface of the flat or round body component. The screw component threads into the bracket component and tightens the band component around the circumference of the flat or round body component. Further, before securing, the fluid absorbing mat or cloth is placed on the outer casing of the hydraulic cylinder, then the flat or round body component is applied and then the hose clamp component is used to secure both the fluid absorbing mat and the body component in the area of the leak.

In one embodiment, multiple hose clamp components can be used to secure the body component to the hydraulic cylinder.

In one embodiment, the hydraulic cylinder leak control device is provided as a kit. The kit would comprise a flat body component of variable length, which can be cut to a specific length for use. The flat body component can comprise a plurality of finger components on the top side and a second flat body component with a plurality of finger components on the top and bottom sides. Further, the kit would also comprise a round body component with a plurality of finger components on the top side and a second round body component with a plurality of finger components on the top and bottom sides. Additionally, the kit would include a fluid absorbing mat and a plurality of hose clamp components of varying sizes.

In one embodiment, the hydraulic cylinder leak control device can be utilized with any suitable hydraulic cylinders of various sizes and shapes, as is known in the art.

In yet another embodiment, the hydraulic cylinder leak control device comprises a plurality of indicia.

In yet another embodiment, a method of managing leaks from a hydraulic cylinder is disclosed. The method includes the steps of providing a hydraulic cylinder leak control device comprising a body component, finger components, a hose clamp component, and a fluid absorbent mat or cloth. The method also comprises wrapping a leaking hydraulic cylinder with the fluid absorbent mat or cloth. Further, the method comprises cutting to length the body component according to the circumference of the leaking hydraulic cylinder. The method also comprises securing the body component around the fluid absorbent mat or cloth, such that the finger components cover the piston part of the hydraulic cylinder. Finally, the method comprises securing a hose clamp component to the body component, which secures the body component in place to allow the equipment to continue in service.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIGS. 5A-B illustrates a perspective view of one embodiment of the hydraulic cylinder leak control device of the present invention in use with hydraulic cylinders of various sizes in accordance with the disclosed architecture; and FIG. 6 illustrates a flowchart showing the method of managing leaks from a hydraulic cylinder in accordance with the disclosed architecture.

DETAILED DESCRIPTION OF THE PRESENT INVENTION

Figure 1:
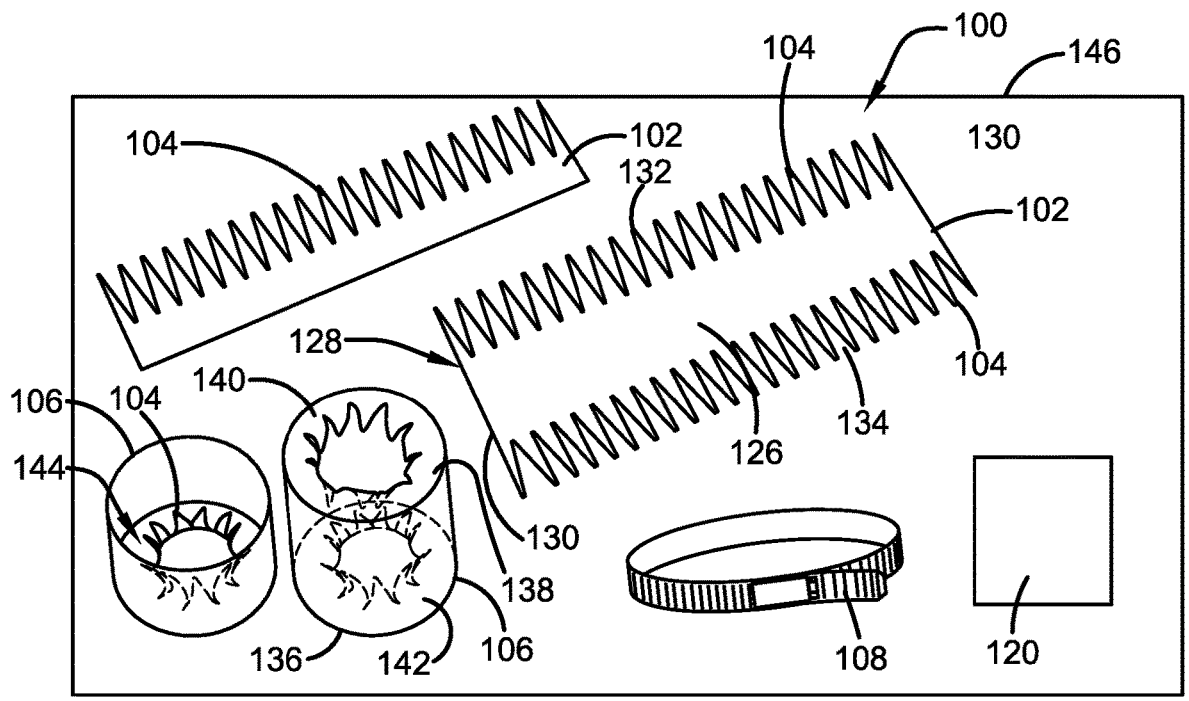
FIG. 1 illustrates a perspective view of one embodiment of the hydraulic cylinder leak control device of the present invention showing the kit with different embodiments in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a hydraulic cylinder leak control device that provides users with a means for controlling leaking hydraulic fluid from a hydraulic cylinder. There is also a long-felt need in the art for a hydraulic cylinder leak control device that features a flat body component with finger components to hold fluid absorbing mats or cloths in place around the hydraulic cylinder. Further, there is a long-felt need in the art for a hydraulic cylinder leak control device that enables users to have a temporary solution to control hydraulic fluid and allow the equipment to continue operation until a technician is available for a permanent repair. Finally, there is a long-felt need in the art for a hydraulic cylinder leak control device that can be used for all types of hydraulic cylinders of various sizes and locations around various equipment.

The present invention, in one exemplary embodiment, is a hydraulic cylinder leak control device. The device is a flexible but rigid band with finger components that can be wrapped around a leaking hydraulic cylinder and held in place with a hose clamp component. The present invention also includes a novel method of managing leaks from a hydraulic cylinder. The method includes the steps of providing a hydraulic cylinder leak control device comprising a body component, finger components, a hose clamp component, and a fluid absorbent mat or cloth. The method also comprises wrapping a leaking hydraulic cylinder with the fluid absorbent mat or cloth. Further, the method comprises cutting to length the body component according to the circumference of the leaking hydraulic cylinder. The method also comprises securing the body component around the fluid absorbent mat or cloth, such that the finger components cover the piston part of the hydraulic cylinder. Finally, the method comprises securing a hose clamp component to the body component, which secures the body component in place to allow the equipment to continue in service.

Referring initially to the drawings, FIG. 1 illustrates a perspective view of one embodiment of the hydraulic cylinder leak control device 100 of the present invention. In the present embodiment, the hydraulic cylinder leak control device 100 is an improved hydraulic cylinder leak control device 100 that provides a user with a variable leak containment device for hydraulic cylinders 122. The hydraulic cylinder leak control device 100 comprises a fluid absorbing mat or cloth 120 that is positioned over a leak on an outer casing 116 of a hydraulic cylinder 122. A body component 102 or 106 is then positioned over the fluid absorbing mat or cloth 120. The body component 102 or 106 would be manufactured to be flexible enough to wrap around an outer casing 116 of a hydraulic cylinder 122 and rigid enough to hold the fluid absorbing mat or cloth 120. Finally, a hose clamp component 108 is then positioned over the body component 102 or 106 to secure the body component 102 or 106 and the mat or cloth 120 to the hydraulic cylinder 122. Thus, each hydraulic cylinder leak control device 100 functions as a suitable way of containing hydraulic fluid leaks and allowing for continued function until maintenance personnel can repair the hydraulic cylinder 122.

Generally, hydraulic cylinders 122 tend to leak or seep, which can cause environmental hazards. A typical hydraulic cylinder 122 comprises an outer casing 116 or exterior surface, a bottom 124, and a piston 118. The outer casing 116 is generally cylindrical in shape with the top surface closed off and a bottom surface open to accept the piston 118. Hydraulic fluid is generally placed into the inside space of the hydraulic cylinder 122. The piston 118 is placed through an opening in the bottom 124 to allow for the piston 118 to move axially to the hydraulic cylinder 122. The bottom 124 seals around the piston 118, but this is also where leaks can form after repeated use. The hydraulic cylinder leak control device 100 of the present invention is then applied to the exterior surface 116 of the hydraulic cylinder 122 to control the leak until it can be repaired.

Generally, the hydraulic cylinder leak control device 100 comprises a body component 102 or 106, a plurality of finger components 104, a fluid absorbent mat or cloth 120, and a hose clamp component 108. The body component 102 or 106 is adapted to capture the fluid absorbing mat or cloth 118 and hold it in contact with the outer casing 116 of the hydraulic cylinder 122 at the location of a leak, and the body component 102 is secured to the hydraulic cylinder 122 via the hose clamp component 108.

In one embodiment, the hydraulic cylinder leak control device 100 comprises a flat body component 102. The flat body component 102 is generally rectangular in shape and is manufactured of a material that is flexible enough to be wrapped around the outer casing 116 of the hydraulic cylinder 122, such as polycarbonate, PVC, aluminum, etc. The flat body component 102 can be any suitable shape as is known in the art, as long as the body component 102 is sized and shaped to wrap around the circumference of a hydraulic cylinder 122 and manage a leak. Further, the flat body component 102 comprises a front surface 126, a back surface 128, opposing right and left sides 130, and opposing top 132 and bottom 134 sides. The body component 102 would be available in various lengths and would typically be provided in a length long enough that a user would cut the body component 102 to fit the circumference of the hydraulic cylinder 122. Thus, a user would measure the circumference of the hydraulic cylinder 122 and then cut the body component 102 to the determined length to wrap around the circumference of the hydraulic cylinder 122 for use.

Additionally, the flat body component 102 comprises a plurality of finger components 104 or pointed projections positioned to be extending from the top side 132 or the bottom side 134, or both of the opposing top 132 and bottom 134 sides of the flat body component 102. The flat body component 102 and the plurality of finger components 104 would be manufactured to be rigid enough to hold a fluid absorbing mat or cloth 120 against the hydraulic cylinder 122 in the area of the leak. The plurality of finger components 104 are generally triangular shaped with the point of the triangle pointing away from the body component 102. The triangles are of a size and shape that when the body component 102 is wrapped around the outer casing 116 of the hydraulic cylinder 122, the plurality of fingers 104 close together around the piston 118 of the hydraulic cylinder 122, creating a seal.

In another embodiment, the body component 106 can be configured in a round, donut-shape that will encircle the outer casing 116 of the hydraulic cylinder 122. Thus, the body component 106 is a round body component 106, that would be circular in shape to match the circumference of the hydraulic cylinder 122. The round body component 106 would be pre-formed to a specific circumference or could have a split running from top to bottom (not shown), to allow a user to spread apart the body component 106 and position it on the hydraulic cylinder 122. Further, the round body component 106 would have a circular body with a front surface 136, a back surface 138, and an opposing top 140 and bottom sides 142. In this embodiment, the round body component 106 would also comprise a plurality of finger components 104 or pointed projections positioned to be extending from the top side 140 or the bottom side 142, or both of the opposing top 140 and bottom 142 sides of the round body component 106. The round body component 106 and the plurality of finger components 104 would be manufactured to be rigid enough to hold a fluid absorbing mat or cloth 120 against the hydraulic cylinder 122 in the area of the leak. The plurality of finger components 104 are generally triangular shaped with the point of the triangle pointing toward the center 144 of the round body component 106. The triangles are of a size and shape that when the body component 106 is positioned around the outer casing 116 of the hydraulic cylinder 122, the plurality of fingers 104 close together around the piston 118 of the hydraulic cylinder 122, creating a seal.

In one embodiment, the hydraulic cylinder leak control device 100 is provided as a kit 146. The kit 146 would comprise a flat body component 102 of variable length, which can be cut to a specific length for use. The flat body component 102 can comprise a plurality of finger components 104 on the top side 132 and a second flat body component 102 with a plurality of finger components 104 on the top 132 and bottom 134 sides. Further, the kit 146 would also comprise a round body component 106 with a plurality of finger components 104 on the top side 140 and a second round body component 106 with a plurality of finger components 104 on the top 140 and bottom 142 sides. Additionally, the kit 146 would include at least one fluid absorbing mat 120 and a plurality of hose clamp components 108 of varying sizes.

Figure 2:
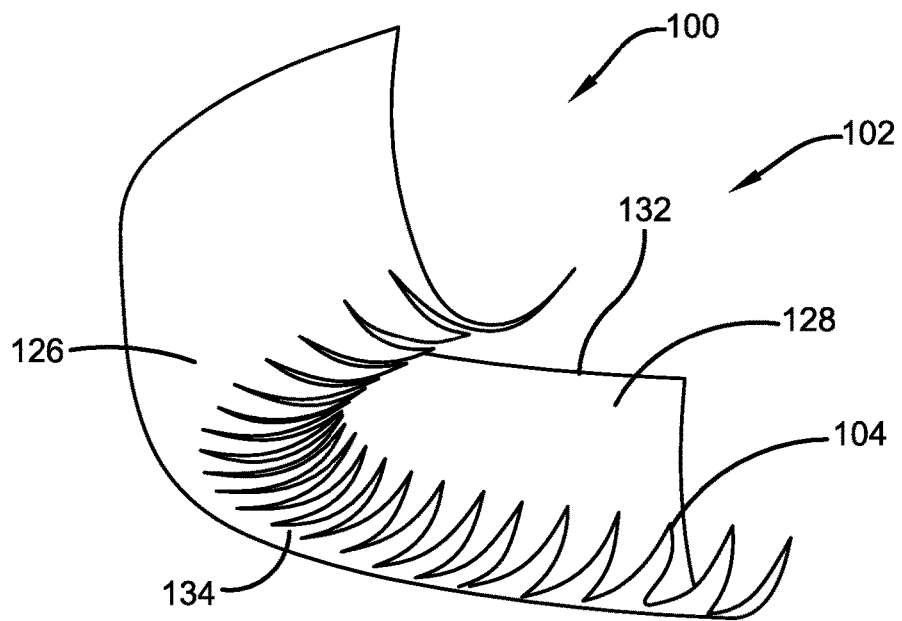
FIG. 2 illustrates a perspective view of one embodiment of the hydraulic cylinder leak control device of the present invention showing the body component in accordance with the disclosed architecture.
Figure 3:
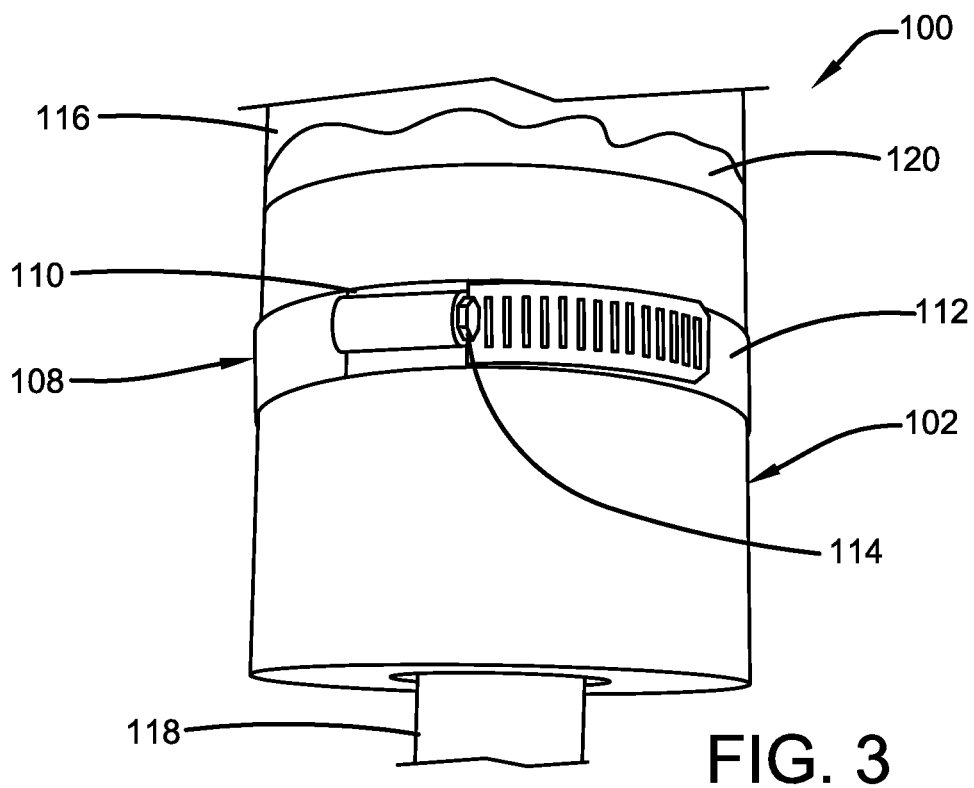
FIG. 3 illustrates a perspective view of one embodiment of the hydraulic cylinder leak control device of the present invention showing how the device is wrapped around a hydraulic cylinder and held in place with a hose clamp component in accordance with the disclosed architecture.
Figure 4:
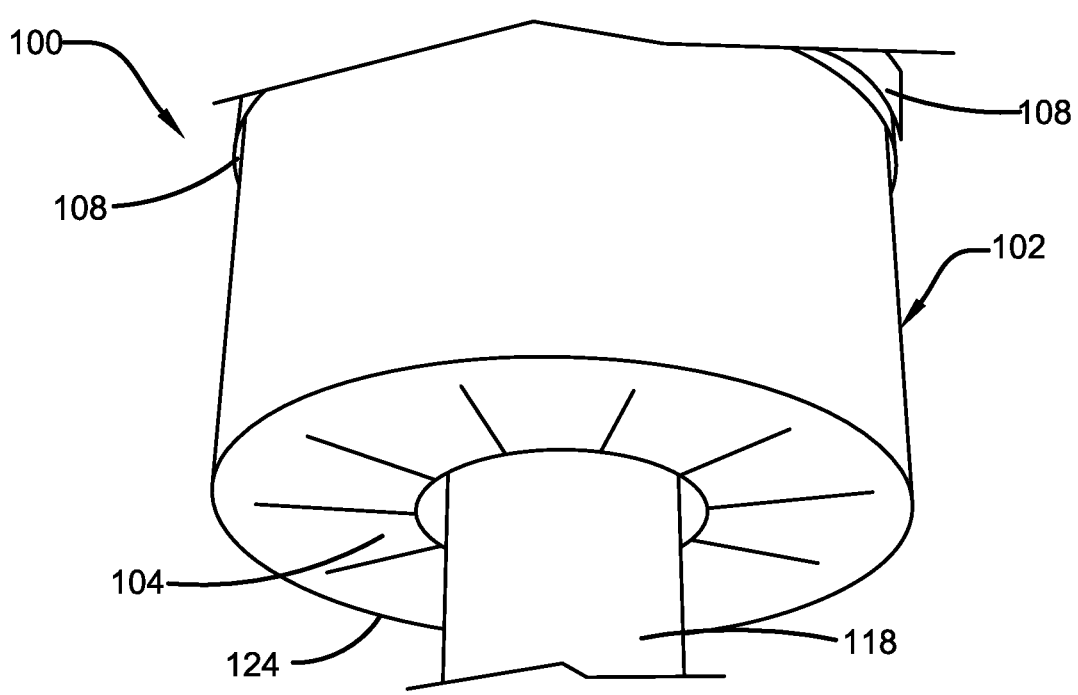
FIG. 4 illustrates a perspective view of one embodiment of the hydraulic cylinder leak control device of the present invention showing how the finger components close around the piston of the hydraulic cylinder in accordance with the disclosed architecture.

As shown in FIGS. 2-4, the hydraulic cylinder leak control device 100 comprises a fluid absorbing mat or cloth 120. The fluid absorbing mat or cloth 120 can be any suitable shape and size as is known in the art, as long as the fluid absorbing mat or cloth 120 is sized and shaped to fit underneath the flat 102 or round 106 body component. Generally, the mat or cloth 120 is configured in a rectangular shape to mimic the shape of the body component 102. Further, the mat or cloth 120 is manufactured of any suitable fluid absorbing material as is known in the art, such as cotton, terrycloth, hemp, bamboo, nylon, etc. In use, the mat or cloth 120 is positioned over the outer casing 116 of the leaking hydraulic cylinder 122 and covered with the flat 102 or round 104 body component, and secured.

In another embodiment, the flat 102 or round 106 body component is manufactured with the fluid absorbent material 120 as an integral part of the back surface 128 or 138 of the flat 102 or round 106 body component. The fluid absorbent material 120 can be secured to the back surface 128 or 138 of the flat 102 or round 106 body component by use of adhesive, screws, snap features, or any other securing means known in the art. Further, the fluid absorbing mat or cloth 120 is manufactured from cotton, hemp, bamboo, or any other suitable absorbent material known in the art.

Furthermore, the flat 102 or round 106 body component is secured to the outer casing 116 of the hydraulic cylinder 122 via a hose clamp component 108. The hose clamp component 108 is a typical hose clamp component as is known in the art and comprises a bracket component 110, a band component 112, and a screw component 114. The bracket component 110 allows the band component 112 to circle around the front surface 126 or 136 of the flat 102 or round 106 body component. Specifically, the screw component 114 threads into the bracket component 110 and tightens the band component 112 around the circumference of the flat 102 or round 106 body component. Further, before securing, the fluid absorbing mat or cloth 120 is placed on the outer casing 116 of the hydraulic cylinder 122, then the flat 102 or round 106 body component is applied and then the hose clamp component 108 is used to secure both the fluid absorbing mat 120 and the body component 102 or 106 in the area of the leak. The hose clamp component 108 is removable and when the leak is repaired, can be removed, as needed.

In another embodiment, multiple hose clamp components 108 can be used to secure the body component 102 or 106 to the hydraulic cylinder 122. Any suitable number of hose clamp components 108 can be utilized as is known in the art, depending on the wants and/or needs of a user, as well as the size of the hydraulic cylinder 122.

Additionally, in use, the hydraulic cylinder leak control device 100 is assembled by first wrapping the outer casing 116 of the hydraulic cylinder 122 at the area of the leak with a fluid absorbing mat or cloth 120. Once the outer casing 116 is wrapped by the fluid absorbing mat or cloth 120, the body component 102 or 106 captures the fluid absorbing mat or cloth 120 and is secured by a hose clamp component 108. Specifically, the body component 102 or 106 comprises a plurality of finger components 104 extending out from the bottom side 134 and 142. The finger components 104 act to wrap around and seal the bottom of the hydraulic cylinder 122. Furthermore, the hydraulic cylinder leak control device 100 is assembled to the outer casing 116 with the plurality of finger components 104 pointing inward, toward the piston 118. The hose clamp component 108 is then secured over the body component 102 or 106 to retain the device 100 on the hydraulic cylinder 122. Thus, when the hydraulic cylinder leak control device 100 is installed on a leaking hydraulic cylinder 122, the leak can be temporarily contained, which allows the equipment to continue in service until a permanent repair can be made.

As shown in FIGS. 5A-B, in use, the hydraulic cylinder leak control device 100 is assembled by first wrapping the outer casing 116 of the hydraulic cylinder 122 at the area of the leak with a fluid absorbing mat or cloth 120. Once the outer casing 116 is wrapped by the fluid absorbing mat or cloth 120, the body component 102 or 106 captures the fluid absorbing mat or cloth 120 and is secured by a hose clamp component 108. Specifically, the body component 102 or 106 comprises a plurality of finger components 104 extending out from the top side 132 and 140 and the bottom side 134 and 142. The finger components 104 act to wrap around and seal the top and bottom of the hydraulic cylinder 122. Furthermore, the hydraulic cylinder leak control device 100 is assembled to the outer casing 116 with the plurality of finger components 104 pointing inward, toward the piston 118. The hose clamp component 108 is then secured over the body component 102 or 106 to retain the device 100 on the hydraulic cylinder 122. Thus, when the hydraulic cylinder leak control device 100 is installed on a leaking hydraulic cylinder 122, the leak can be temporarily contained, which allows the equipment to continue in service until a permanent repair can be made.

Generally, the hydraulic cylinder leak control device 100 can be utilized with any suitable size hydraulic cylinder 122 and piston 118, as is known in the art. Further, any suitable amount of hose clamp components 108 can be secured to the flat 102 or round 106 body component, as is known in the art. For example, hose clamp components 108 can be applied to the top and bottom of the flat 102 or round 106 body component, or closer to the piston 118 and further away from the piston 118.

In yet another embodiment, the hydraulic cylinder leak control device 100 comprises a plurality of indicia 148. The flat body component 102 or round body component 106 of the device 100 may include advertising, a trademark, or other letters, designs, or characters, printed, painted, stamped, or integrated into the flat body component 102 or the round body component 106, or any other indicia 148 as is known in the art. Specifically, any suitable indicia 148 as is known in the art can be included, such as, but not limited to, patterns, logos, emblems, images, symbols, designs, letters, words, characters, animals, advertisements, brands, etc., that may or may not be a hydraulic cylinder, leak, or brand related.

FIG. 6 illustrates a flowchart of the method of managing leaks from a hydraulic cylinder. The method includes the steps of at 600, providing a hydraulic cylinder leak control device comprising a body component, finger components, a hose clamp component, and a fluid absorbent mat or cloth. The method also comprises at 602, wrapping a leaking hydraulic cylinder with the fluid absorbent mat or cloth. Further, the method comprises at 604, cutting to length the body component according to the circumference of the leaking hydraulic cylinder. The method also comprises at 606, securing the body component around the fluid absorbent mat or cloth, such that the finger components cover the piston part of the hydraulic cylinder. Finally, the method comprises at 608, securing a hose clamp component to the body component, which secures the body component in place to allow the equipment to continue in service.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "hydraulic cylinder leak control device", "leak control device", "hydraulic cylinder device", and "device" are interchangeable and refer to the hydraulic cylinder leak control device 100 of the present invention.

Notwithstanding the foregoing, the hydraulic cylinder leak control device 100 of the present invention can be of any suitable size and configuration as is known in the art without affecting the overall concept of the invention, provided that it accomplishes the above stated objectives. One of ordinary skill in the art will appreciate that the hydraulic cylinder leak control device 100 as shown in FIGS. 1-6 is for illustrative purposes only, and that many other sizes and shapes of the hydraulic cylinder leak control device 100 are well within the scope of the present disclosure. Although the dimensions of the hydraulic cylinder leak control device 100 are important design parameters for user convenience, the hydraulic cylinder leak control device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A hydraulic cylinder leak control device that provides a user with a variable leak containment device for hydraulic cylinders, the hydraulic cylinder leak control device comprising:
   a flat body component;
   a fluid absorbing cloth; and
   a hose clamp component;
   wherein the fluid absorbing cloth is positioned over a leak on an outer casing of a hydraulic cylinder;
   wherein the flat body component is generally rectangular in shape and is secured over the fluid absorbing cloth to capture the fluid absorbing cloth and hold it in contact to the outer casing of the hydraulic cylinder at a location of the leak; and further wherein the hose clamp component is secured over the flat body component to contain the leak and allow for continued function of the hydraulic cylinder.

2. The hydraulic cylinder leak control device of claim 1, wherein the flat body component wraps around the circumference of the hydraulic cylinder.

3. The hydraulic cylinder leak control device of claim 2, wherein the flat body component comprises a front surface, a back surface, opposing right and left sides, and opposing top and bottom sides.

4. The hydraulic cylinder leak control device of claim 3, wherein the flat body component would be available in an extended length that is cut to fit the circumference of the hydraulic cylinder.

5. The hydraulic cylinder leak control device of claim 4, wherein the flat body component comprises a plurality of finger components positioned to be extending from the top side or the bottom side of the flat body component.

6. The hydraulic cylinder leak control device of claim 4, wherein the flat body component comprises a plurality of finger components positioned to be extending from both the top and bottom sides of the flat body component.

7. The hydraulic cylinder leak control device of claim 6, wherein the plurality of finger components are generally triangular shaped with a point of triangle pointing away from the flat body component.

8. The hydraulic cylinder leak control device of claim 7, wherein the plurality of finger components wrap around the outer casing of the hydraulic cylinder and close together around a piston of the hydraulic cylinder, creating a seal.

9. The hydraulic cylinder leak control device of claim 1, wherein the hydraulic cylinder leak control device is provided as a kit containing the flat body component, a round body component, at least one fluid absorbing cloth and a plurality of hose clamp components of varying sizes.

10. A hydraulic cylinder leak control device that provides a user with a variable leak containment device for hydraulic cylinders, the hydraulic cylinder leak control device comprising:

a flat body component comprises a front surface, a back surface, opposing right and left sides, and opposing top and bottom sides;

a fluid absorbing cloth; and a hose clamp component comprising a bracket component, a band component, and a screw component; and wherein the fluid absorbing cloth is positioned over a leak on an outer casing of a hydraulic cylinder;

wherein the flat body component comprises a plurality of finger components positioned to be extending from the top side or the bottom side or both of the flat body component;

wherein the plurality of finger components are generally triangular shaped with a point of triangle pointing away from the flat body component;

wherein the plurality of finger components wrap around the outer casing of the hydraulic cylinder and close together around a piston of the hydraulic cylinder, creating a seal;

wherein the flat body component is secured over the fluid absorbing cloth to capture the fluid absorbing cloth and hold it in contact to the outer casing of the hydraulic cylinder at a location of the leak;

wherein the hose clamp component is secured over the flat body component to contain the leak and allow for continued function of the hydraulic cylinder; and further wherein the bracket component allows the band component to circle around the front surface of the flat body component, and the screw component threads into the bracket component and tightens the band component around the circumference of the flat body component.

11. The hydraulic cylinder leak control device of claim 10, wherein the fluid absorbent material is an integral part of the back surface of the flat body component.

12. The hydraulic cylinder leak control device of claim 10, wherein multiple hose clamp components can be used to secure the flat body component to the hydraulic cylinder.

13. The hydraulic cylinder leak control device of claim 10 further comprising a plurality of indicia.

14. The hydraulic cylinder leak control device of claim 10, wherein the hydraulic cylinder leak control device is provided as a kit containing at least one flat body component, at least one round body component, at least one fluid absorbing mat and a plurality of hose clamp components of varying sizes.

15. A method of managing leaks from a hydraulic cylinder, the method comprising the following steps:

providing a hydraulic cylinder leak control device comprising a body component, finger components, a hose clamp component, and a fluid absorbent mat or cloth;

wrapping a leaking hydraulic cylinder with the fluid absorbent mat or cloth;

cutting to length the body component according to the circumference of the leaking hydraulic cylinder;

securing the body component around the fluid absorbent mat or cloth, such that the finger components cover the piston part of the hydraulic cylinder; and securing a hose clamp component to the body component, which secures the body component in place to allow the equipment to continue in service.

* * * * *